(12) United States Patent
Janke

(10) Patent No.: US 7,139,682 B2
(45) Date of Patent: Nov. 21, 2006

(54) SENSOR SYSTEM WITH VARIABLE SENSOR-SIGNAL PROCESSING

(75) Inventor: Ralf Janke, Gundelfingen (DE)

(73) Assignee: Micronas GmbH, Freiburg (DE)

( * ) Notice: Subject to any disclaimer, the term of this patent is extended or adjusted under 35 U.S.C. 154(b) by 269 days.

(21) Appl. No.: 09/977,484

(22) Filed: Oct. 15, 2001

(65) Prior Publication Data

US 2002/0099523 A1 Jul. 25, 2002

(30) Foreign Application Priority Data

Oct. 13, 2000 (DE) .................................. 100 50 819

(51) Int. Cl.
G01D 18/00 (2006.01)
(52) U.S. Cl. .................... 702/189; 702/104; 702/107; 702/127
(58) Field of Classification Search ................ 702/189, 702/85, 104, 107, 106, 127, 183, 188, 94, 702/151, FOR. 170, FOR. 103, FOR. 104, 702/FOR. 134, FOR. 135, FOR. 156–FOR. 163; 701/41, 42, 1, 36, 103, 104, 107, 108, 29, 701/31, 33, 34; 73/1.75; 180/204; 340/318.01, 340/438; 123/339.2, 339.15
See application file for complete search history.

(56) References Cited

U.S. PATENT DOCUMENTS

| | | | | |
|---|---|---|---|---|
| 4,723,122 A | | 2/1988 | Maltby et al. ............... 340/870 |
| 4,911,129 A | * | 3/1990 | Tomisawa .................... 123/674 |
| 5,006,841 A | * | 4/1991 | Vines et al. ................ 340/3.51 |
| 5,143,452 A | | 9/1992 | Maxedon et al. ........... 374/170 |
| 5,150,301 A | * | 9/1992 | Kashiwabara et al. ...... 701/106 |
| 5,270,935 A | * | 12/1993 | Dudek et al. ................. 701/99 |
| 5,394,849 A | * | 3/1995 | Tomisawa .................... 123/435 |
| 5,857,160 A | * | 1/1999 | Dickinson et al. ............. 701/41 |
| 5,968,100 A | | 10/1999 | Kayano et al. ................. 701/1 |
| 6,256,983 B1 | * | 7/2001 | Yasui ........................... 60/285 |
| 6,363,305 B1 | * | 3/2002 | Kaufmann et al. ........... 701/41 |
| 6,424,143 B1 | * | 7/2002 | Blossfeld et al. ........... 324/160 |
| 6,463,371 B1 | * | 10/2002 | Ulyanov et al. .............. 701/40 |

FOREIGN PATENT DOCUMENTS

| | | |
|---|---|---|
| DE | 197 15 047 A1 | 10/1998 |
| DE | 197 19 633 C2 | 11/1998 |
| DE | 19719633 A1 * | 11/1998 |
| DE | 197 19 633 | 12/1998 |
| EP | 0 048 851 | 4/1982 |
| EP | 0048851 B1 * | 4/1982 |

OTHER PUBLICATIONS

Translation of DE 197 19 633 A1.*
Translation of EPO 0 048 851 B1.*

* cited by examiner

*Primary Examiner*—Hal D. Wachsman
(74) *Attorney, Agent, or Firm*—O'Shea, Getz & Kosakowski, P.C.

(57) ABSTRACT

A sensor system with variable sensor-signal processing comprises an integrated circuit sensor unit. The integrated circuit sensor unit includes a sensor element that provides a sensed signal in response to a measurement variable, and a memory device that stores adjustable coefficient values. The integrated circuit sensor units also includes a sensor signal processing unit that processes the sensed signal using adjustable coefficient values to provide a sensor output signal on a output line. The sensor system receives updated adjustable coefficient values via the output line and stores the updated adjustable coefficient values in the memory device.

7 Claims, 2 Drawing Sheets

SENSOR SYSTEM WITH VARIABLE SENSOR-SIGNAL PROCESSING

BACKGROUND OF THE INVENTION

The present invention relates to the field of sensor systems, and in particular to a technique for programming a sensor, such as a magnetic field sensor, for example a linear Hall effect sensor.

Conventional sensor systems are described, for example, in "Hütte—die Grundlagen der Ingenieurwissenschaften, Herausgeber: Akademischer Verein Hütte e. v., Berlin, edited by Horst Czichos, 30th newly revised and expanded edition, Berlin: Springer Verlag 1996, page H 18 ff" [Hütte—Basic Principles of the Engineering Sciences]. This publication discloses a sensor system that contains a sensor unit and an analytical unit. The sensor unit includes at least one sensor element that senses a measurement variable and generates a sensor signal representing this measurement variable. A sensor-signal processing unit then receives and processes the sensor signal. The function of the analytical unit is to analyze the sensor signals processed by the sensor processing unit.

There are a plurality of prior-art sensor types. These include, for example, four main types such as:

(i) sensors whose signals are processed in the sensor-signal processing unit in accordance with fixed algorithms (type 1); (ii) sensors whose signal processing in the sensor-signal processing unit can be freely programmed (type P); (iii) sensors whose signal processing is regulated (type R); and (iv) sensors whose signal processing in the sensor-signal processing unit can be both programmed and regulated. We shall now briefly describe these prior art sensor types:

Sensors with Fixed Signal Processing Algorithms

The most widespread sensor systems convert a generally analog physical or chemical measurement variable (M) into an output signal in accordance with fixed prescribed algorithms. Physical measurement variables can be, for example, pressure, temperature, and magnetic field. Chemical measurement variables can be, for example, the chemical reaction rate and the reaction enthalpy, or the like.

The sensor element typically converts the physical (or chemical) measurement variable (M) into an internal voltage signal U(M). However, it is also possible to generate a current signal or an optical signal that is indicative of the measurement variable M.

The sensors discussed hereinafter shall be discussed in the context of sensors that convert a physical measurement variable M into an internal voltage signal U(M). The amplitude of the internal voltage signal U(M) represents the physical measurement variable M. However, this assumption is made without any restriction of generality.

The output signal (Out) of most sensor units is proportional to the measurement variable M. However, especially in the case of magnetic field sensors, there are types which transform an analog measurement variable M into an output signal (Out) which has only two states. These are generally called switching sensors. Such switching sensor units have two fixed prescribed threshold values $G_1$ and $G_2$. In the following, we assume $G_1 > G_2$. In the output, these generate a signal Out="1" if the internal voltage signal U(M)>$G_1$, and an output signal Out="0" if U(M)<$G_2$:

$$Out_{new} = \begin{cases} 1, \text{ if } (U(M) > G_1 \Delta\ Out_{old} = 0) \\ 0, \text{ if } (U(M) < G_2 \Delta\ Out_{old} = 1) \end{cases} \quad (1)$$

Sensor System with Freely Programmable Algoritms

Besides sensor units in which the sensor signal is processed in accordance with fixed algorithms, there are types in which the processing algorithm can be freely programmed by fixed prescribed parameters. These fixed prescribed parameters are stored for example, in EEPROM cells, which are situated on the same chip as the other components of the sensor unit (e.g., the sensor element and the sensor-signal processing unit). An example of this is the analog sensor of the construction series HAL800 manufactured by Micronas GmbH, the assignee of the present invention. Its analog output signal can be programmed in the parameters $C_1$ and $C_2$ as $$Out = c_1 * U(M) + c_2 \quad (2)$$

Its advantage compared to the sensor systems with fixed signal processing algorithms is that the programming can reduce production-based variations and influences due to the interactions of the sensor system with its action.

Once the programming process is concluded, the sensor unit behaves like a sensor unit with a fixed signal processing algorithm as discussed above. Accordingly, the sensor unit has fixed settings by which the measurement variable M is converted into an output signal Out. However, a problem with this technique is that the programming adjustments can no longer be changed, that is, this state is technically called "locked."

Sensor Units with Control Algorithms

In a third class of sensor units, the sensor-signal processing unit operates with internal regulation algorithms. Such regulation algorithms convert a time-variable, analog, internal voltage signal U(M,t) into an output signal Out. The time dependence of the internal voltage signal U(M) is identified by the reference symbol t.

For example, there exist adaptive magnetic field sensors in which the internal voltage signal U(M) is subjected to high-pass filtering. Specifically, the DC component of the internal voltage signal U(M) is attenuated, and in the ideal case only a sinusoidal alternating signal U(MAC) remains. If this remaining sinusoidal alternating signal exceeds a given threshold $G_1$, then—as in the example described above—an output state Out="1" is generated. However, if the AC component is less than a second threshold $G_2$, the output signal Out="0" is generated. The mathematical representation of such a generation of the output signal is given by equation (3) as follows:

$$U(M_{AC}) \Rightarrow U(M) - \int_{t_1}^{t_2} U(M)dt \quad (3)$$

$$Out_{new} = \begin{cases} 1, \text{ if } (U(M_{AC}) > G_1 \Delta\ Out_{old} = 0) \\ 0, \text{ if } (U(M_{AC}) < G_2 \Delta\ Out_{old} = 1) \end{cases}$$

Sensors of this type, in contrast to the previous two types discussed above, also take into account the time behavior of the measurement variable M.

Sensors with Programmable Regulation Algorithms

This fourth class of sensor units is a combination of the type with freely programmable algorithms and the type with control algorithms. Sensors of type with programmable regulation algorithms consequently combine the advantages of a sensor unit of the type with freely programmable algorithms and of a sensor unit of the type with control algorithms. Since signal processing is freely programmable, one can compensate the tolerances of a total system, consisting of mechanical components and the actual sensor system. However, as the result of regulation, the output signal Out will react to the instantaneous time behavior of the measurement variable M(t). Conventional sensor systems preferably operate by the latter method. However, a problem with this technique is that changes of the sensor system are no longer compensated, especially of the sensor element, within the lifetime of the sensor unit.

Therefore, there is a need for a sensor that can be programmed to compensate for changes in the sensor system that occur throughout the operating life of the sensor.

SUMMARY OF THE INVENTION

Briefly, according to an aspect of the present invention, a sensor system includes a sensor signal processing unit and an analytical unit. The analytical unit is designed in such a way that at least one parameter (i.e., adjustable coefficient values) for signal processing can be redefined on the basis of the output signals delivered by the sensor processing unit. At least one connecting line between a sensor-signal processing unit and the analytical unit establishes a connection for transmitting at least one of the newly defined parameters (i.e., updated adjustable coefficient values) for processing the sensor signal to the sensor-signal processing unit. The sensor-signal processing unit is inventively designed in such a way that the newly transmitted parameters for processing the sensor signal replace the originally prescribed parameters.

The analytical unit determines anew at least one of the parameters for processing the signal, and transmits at least one of these newly determined parameters to the signal processing unit over an existing connection line or, in some circumstances, an existing wireless connection path between the sensor unit and the analytical unit. The sensor-signal processing unit then uses the newly transmitted parameter to compute the output signal. If the analytical unit determines, after analyzing the sensor data and possibly other available data, that the sensor unit may sense the measurement value better with a changed set of parameters, the inventive method assures that the sensor signals in the future will be processed with this new parameter set.

In one embodiment, a connection line configured to transmit data from the sensor unit to the analytical unit is also used to transmit the newly determined parameters from the analytical unit to the sensor-unit. The connecting line is preferably the output for the processed sensor signal. This embodiment has the advantage that no further connecting line is needed between the sensor unit with its sensor element and signal processing unit (which generally is present in integrated form on a chip) and the external analytical unit. In particular, this assures that this novel, inventive sensor system generation can easily replace the prior art sensor systems.

In a second embodiment, the transmission line for the determined parameters can be a common power supply line for the sensor unit and the analytical unit. In this case, too, as in the previous example, it is assured that an old sensor system can be replaced without any problem by a sensor system according to the present invention. Such compatibility is an absolute prerequisite especially for installation in a mass-produced product.

The invention specifies a third embodiment such that necessary changes of a parameter for the processing of the signal can be determined during running (sensor-) operation. It is further specified that at least one of the newly determined parameters can be transmitted to the signal processing unit while operation is in progress, so as to assure constant updating of the parameter set in the sensor-signal processing unit. This design of the invention is especially necessary if the sensor system operates or is supposed to operate continuously. That is, the parameters stored in a parametric memory associated with the sensor can be updated while the sensor continues to process sensed signal data.

In the case of a sensor system of the third embodiment, it is necessary that the process of transmitting a new parameter set does not interfere with the ongoing signal transmission from the sensor unit to the analytical unit. This is especially important for exact temporal association or for instant recognition of changes or disturbances. For this reason, a fourth embodiment includes a filter device that permits the newly determined parameters to be transmitted to the sensor unit only if this does not disturb signal transmission from the sensor unit.

In a fifth embodiment, at least one parameter can be transmitted by a change of an output load between the sensor-signal processing unit and the analytical unit. Such a load change can be caused, in well-known fashion, by the analytical unit and thus can be generated outside the sensor unit.

In yet another embodiment, the invention specifies that this output load can be varied continuously, or in steps.

Alternatively or additionally, at least one parameter can be transmitted by a change of a supply voltage for the sensor unit. Such a modulation of the supply voltage for the sensor unit does not necessarily presuppose that the sensor unit and the analytical unit are supplied by one and the same voltage source. That is, it is contemplated that it is also possible to modulate the voltage supply of the sensor unit and especially of the sensor-signal processing unit by an appropriate control line.

Such a sensor system and such a method is generally applicable to programmable sensor systems in which an analytical unit (analytical electronics) analyzes a sensor signal and possibly other signals. For this purpose, the sensor can be programmed with one or more parameters. During operation, the analytical electronics determine whether or not a parameter should be changed. This wish for a change is communicated to the sensor on a channel which does not disturb the transmission of the actual sensor signals to the analytical electronics. By way of example, one can mention detection of magnetic field changes, a method which is especially used to measure the angular position of the crankshaft, camshaft, and ABS in a motor vehicle.

Advantageously, the techniques of the present invention facilitate updating parameter data of the sensor regularly during the operating life of the sensor.

These and other objects, features and advantages of the present invention will become more apparent in light of the following detailed description of preferred embodiments thereof, as illustrated in the accompanying drawings.

DETAILED DESCRIPTION OF THE INVENTION

Figure 1:
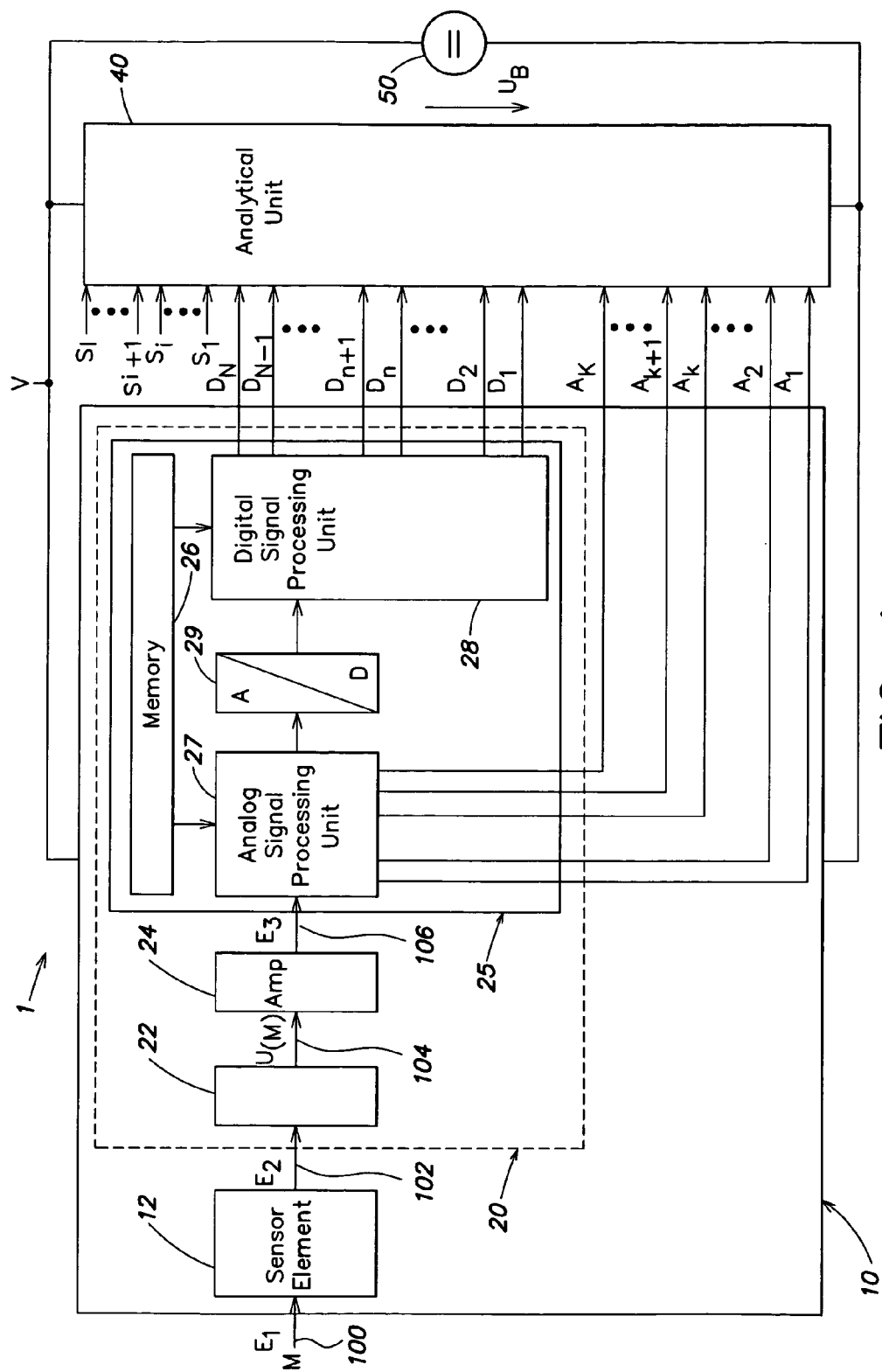
FIG. 1 illustrates a first embodiment of a programmable sensor system.

FIG. 1 is a block diagram illustration of an inventive sensor system.

The basic components of a sensor system 1, as shown in FIG. 1, include functions as described, for example, in the cited reference "Hütte." In the present example, the sensor system 1 is based on a sensor unit 10 and an analytical unit 40. In this example, these are supplied with electric power from a power supply unit 50.

The sensor unit 10 is usually accommodated on a silicon chip. The analytical unit 40 is connected to the sensor unit 10 by a plurality of connecting lines. The analytical unit may be spatially separated from the sensor unit 10. The analytical unit 40 may be a small microcomputer or part of a larger automation system. Depending on the application, the sensor unit 10 and the analytical unit 40 can be connected by a single line, by several lines, or even by a data bus. In the present example, the sensor unit 10 includes a sensor element 12 and an output signal generation unit 20. The output signal generation unit 20 includes a unit 22 for processing the measurement variables, an amplifier unit 24, and a sensor-signal processing unit 25.

In this example, some of the circuit blocks are optional, namely the unit 22 for processing the measurement variables, and the amplifier unit 24 (i.e., these circuit elements need not necessarily be part of the sensor unit 10). They are cited in this example only to indicate that the output signal generation unit 20 has circuit elements whose function cannot be varied externally, and circuit elements—in this example, the sensor processing unit 25—whose function can be varied/controlled externally.

The sensor-signal processing unit 25 includes an analog signal processing unit 27, an analog-to-digital (A/D) converter 29 connected thereto, and a digital signal processing unit 28. In this example, the analog signal processing unit 27 and the digital signal processing unit 28 are connected to a parameter memory 26.

In this example, the analog signal processing unit 27 provides a plurality of signal outputs $A_1, A_2 \ldots A_k, A_{k+1} \ldots A_K$, which are connected to the analytical unit 40. The digital processing unit 28 also provides a plurality of signal outputs $D_1, D_2 \ldots D_n, D_{n+1} \ldots D_N$ to the analytical unit 40. The analytical unit 40 also receives a plurality of control signal inputs $S_1 \ldots S_i, S_{i+1} \ldots S_j$. The operation of the sensor unit 10 shall now be discussed.

A chemical or physical measurement variable M is input to the sensor element 12 on a line 100. The sensor element 12 preferably converts this physical or chemical measurement variable M into an electrical signal provided on a line 102. For example, the electrical signal on the line 102 can be a voltage or current signal which depends on the measurement variable M, such that its amplitude changes with the measurement variable M. The electrical signal on the line 102 is input to the unit 22 for processing the measurement variables. This unit 22 for processing the measurement variables can be, for example, a current-to-voltage converter. However, it is also conceivable that it converts this preferably electrical input variable into an optical signal. In this example, an internal voltage signal U(M) is generated and provided on a line 104, and the signal amplitude is essentially proportional to the measurement variable M.

It is frequently necessary for this internal voltage signal U(M) on the line 104 to be initially amplified in the amplifier unit 24 to eliminate noisy influences and assure proper signal processing. The amplifier unit provides an amplified signal on a line 106 to the sensor signal processing unit 25.

In the sensor-signal processing unit 25 this amplified signal is processed by the analog signal processing unit 27. For example, the analog signal processing unit 27 can perform integrations or differentiations. The example indicates that each individual processing step may directly generate an output signal, which can be tapped from the indicated signal outputs $A_1, A_2 \ldots A_k, A_{k+1} \ldots A_K$.

In the present example, the operation of the analog signal processing unit 27 can be varied externally by a parameter set. This parameter set is stored, for example, in the parameter memory 26.

Sensor systems of more recent generations generally omit the complicated analog signal processing. Consequently, the circuit component analog signal processing unit 27 will generally not be part of the sensor-signal processing unit 25. However, implementation of such an analog signal processing unit 27, by way of example, should demonstrate that the present inventive idea is certainly not limited to sensor systems with predominantly digital signal processing.

In the present example, such an analog processed signal is now conducted to an analog-to-digital converter 29 that provides a digitized signal to the digital signal processing unit 28. This digital signal processing unit 28 now processes the sensor signal in well-known fashion, and outputs it directly as a parallel or serial signal, or it outputs several parallel or serial signals after various processing steps. Such an interface is identified in the example by signal outputs $D_1, D_2 \ldots D_n, D_{n+1} \ldots D_N$.

Operation of the digital signal processing unit 28 can be parameterized by a parameter set stored in the parameter memory 26. EEPROM cells are preferably used for the parameter memory 26. These are preferably situated on the same chip as the other components of the sensor unit 10.

With reference to the description of the mode of functioning of a sensor system of type R, the mode of functioning of an inventive sensor system 1 will be explained in terms of the present example:

The analytical unit 40 analyzes the sensor data delivered by the sensor unit 10, and in particular by the sensor-signal processing unit 25 (such as the signal outputs $D_1, D_2 \ldots D_n, D_{n+1} \ldots D_N; A_1, A_2 \ldots A_k, A_{k+1} \ldots A_K$) as well as other data that may be present (possibly transmitted through the control signal lines $S_1 \ldots S_i, S_{i+1} \ldots S_j$). We shall now discuss the system operation assuming that this analysis by the analytic unit 40 determines that it would be beneficial to change a parameter in the sensor unit 10 (e.g., parameter memory 26).

In one example, the analytical unit 40 may determine that the subtraction of the AC component $U(M_{AC})$ needs to be corrected again, during running operation, by a correction value U, so as to achieve better performance of the overall system. The correction value U is therefore calculated in the analytical unit 40 (i.e., outside the sensor unit 10). The correction value U is now set, for example, in the digital signal processing unit 28 (i.e., within the sensor unit 10) so that the following signal processing operation can be performed:

$$U(M_{AC}) \Rightarrow U(M) - \int_{t_2}^{t_1} U(M)\,dt + \Delta U \qquad (5)$$

$$Out_{new} = \begin{cases} 1, \text{ if } (U(M_{AC}) > G_1 \ Out_{old} = 0) \\ 0, \text{ if } (U(M_{AC}) < G_2 \ Out_{old} = 1) \end{cases}$$

$U(M_{AC})$ represents the AC component of the internal voltage signal U(M), and $\Delta U$ represents the correction value introduced above. The new output signal $OUt_{new}$ differs from the original, old output signal $OUt_{old}$, as in the example described above, if the AC component $U(M_{AC})$—which has been changed due to the correction value $\Delta U$ —now lies above the corresponding threshold $G_1$ or below the threshold $G_2$, as a result of this change.

According to an aspect of the invention, the parameter set in the parameter memory 26 can be corrected for example by the analytical unit 40 transmitting the value of the correction $\Delta U$ as a parameter during running operation of the sensor unit 10, over one or more of the existing connection lines between the sensor unit 10 and the analytical unit 40. These connection lines are identified in the example by the reference symbols $A_1, A_2 \ldots A_k, A_{k+1} \ldots A_K$.

The transmission or transfer process of the new parameter data to the sensor unit may not disturb the ongoing transmission of signals from the sensor unit 10 to the analytical unit 40. For example, in the case of time-critical systems in motor vehicles, such as measurements of the rotation angle of a gear wheel (camshaft, crankshaft, or ABS), the temporal representation of the angles ($Out_{old}$="1" to $Out_{new}$="0" or vice versa) must not be disturbed by the correction process.

Figure 2:
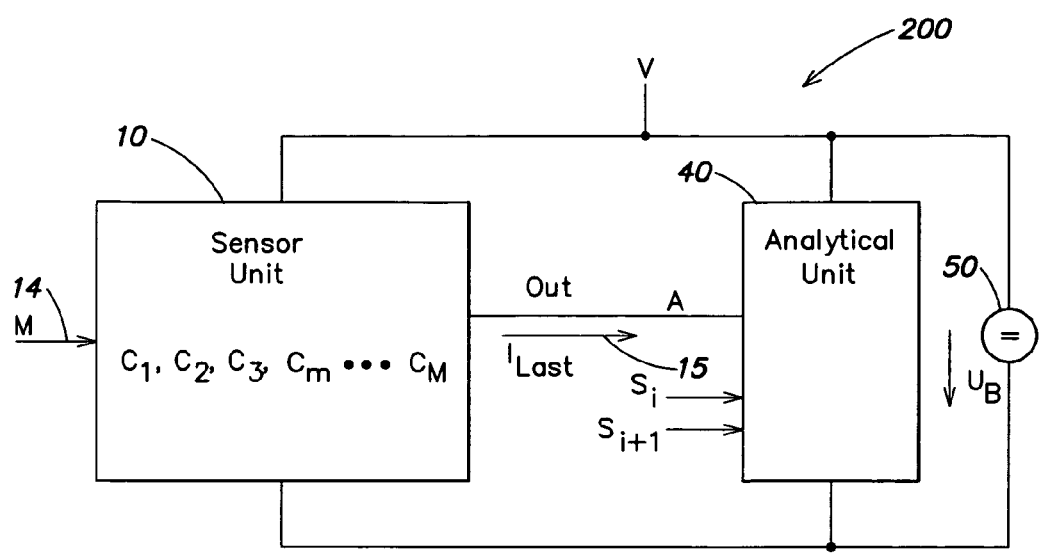
FIG. 2 illustrates a second embodiment of a programmable sensor system.

To clarify the invention, FIG. 2 shows another inventive sensor system 200 comprising a sensor unit 10 and an analytical unit 40, connected to the sensor unit by a connecting line A. The sensor unit 10 and the analytical unit 40 are supplied with electrical power from the electric power supply unit 50, at a voltage $U_B$ via the supply line V. A physical or chemical measurement variable M can be conducted to the sensor system 1 on a line 14, so as to be transformed and processed in the sensor unit 10 in the manner described above. It is transmitted as an output signal Out through the connecting line A to the analytical unit 50.

Signal processing in the sensor unit 10 is characterized in the present example by the programmable parameters ($C_1$, $C_2, C_3 \ldots C_m, C_{m+1} \ldots C_M$). Further, for example, two of the control signal lines assigned to analytical unit 40 are shown, through which the control signals $s_i$ and $s_{i+1}$ can be conducted to the analytical unit 40.

FIG. 2 shows the interaction between the analog measurement variable M of the sensor unit 10 and the analytical unit 40. The arrows labeled with the reference symbols 14 and 15 show the direction of information and data flow when a measurement effect is determined during ongoing operation of the sensor system 200. In particular, the arrow 15 between the sensor unit 10 and the analytical unit 40 shows the data flow when data are transferred from the sensor unit 10 to the analytical unit 40—in the case of a programmed sensor unit 10 in the "locked" state.

Previously known sensors have only one possible way to influence the parameters $C_1, C_2, C_3 \ldots C_m \ldots C_M$, which are stored in the sensor unit 10. The present invention now specifies that the analytical unit 40 analyzes the signal Out (and possibly other operating parameters of the sensor unit 10). Advantageously, it is also possible to draw upon other control signals $s_i$ and $s_{i+1}$ for this analysis, that is control signals which are independent of the sensor unit itself. By the data available to it the analytical unit 40 now regularly checks the validity of the parameter set $C_1, C_2, C_3 \ldots C_m \ldots C_M$.

By way of example, a sensor system 1 is considered below whose sensor unit 10 monitors a system that includes a permanent magnet and a gear wheel. By measuring the magnetic field of the gear wheel, the sensor unit 10 represents its rotation by a time-domain pulse train. The output signal Out, which is sent to the analytical unit 40, consists of a sequence of "0" and "1" which, for example, can be transmitted through an open-collector-output.

For the sake of simplicity, let us assume that the analytical unit 40 can modify the processing of sensor signals (generally designated as the sensor algorithm) by a single parameter, namely the correction value $\Delta U$. If the analytical unit 40 determines that the correction value $\Delta U$ is to be changed, the change is communicated to the sensor unit 10 by changing the load between the sensor unit 10 and the analytical unit 40. This load change is produced in the analytical unit 40, and therefore is generated outside the sensor unit 10. One example is the load which results from a variable load current at essentially constant voltage. This current is identified by the reference symbol $I_{load}$.

For example, if, during normal operation, an average load current $I_0$ flows in the signal load path, a change of the output load with the load current $I_1$, which is greater than the average load current $I_0$ in normal operation, can communicate to the sensor unit 10 that the correction quantity $\Delta U$ should be increased. For example, if the load current is changed to a value $I_2 > I_1 > I_0$, a reduction of the correction quantity $\Delta U$ can also be transmitted. The change of the load current from $I_0$ to $I_1$ or $I_2$ can be continuous or can occur at a certain frequency.

The sensor unit 10 has a circuit arrangement which can detect the change of the load current $I_{load}$ from $I_0$ to $I_1$ or $I_2$, and can then correspondingly vary the correction quantity $\Delta U$.

In this connection, it should be noted that the time which the sensor unit 10 takes to reliably detect the change is known to the analytical unit 40, so that the changed load $I_{load}$ is also maintained for a sufficiently long time. The signal processing unit and the sensor unit 10 thereupon change the value of the correction quantity $\Delta U$ in appropriate fashion. Feedback to the analytical unit 40 is not necessary. In this way, it is possible that the analytical unit initially continues to operate with the changed load current $I_2$ or $I_1$, or—which generally makes more sense—operates with the lowest load current $I_0$. The analytical unit 40 will now analyze further whether the change was sufficient. If another change should be required, the analytical unit 40 again requests this change. A change preferably is effected with the smallest possible increment.

Of course, other possible ways of transmitting a changed parameter set $c_1, c_2 \ldots$ are conceivable. However, it is always presupposed that the nominal operation of providing sensor data will not be disturbed.

The invention specifies that this supply voltage $U_B$ of the sensor unit 10 and/or of the sensor-signal processing unit 25 can be modulated. Through this modulation, the sensor unit 10 recognizes which parameter $c_i$ must be changed, in what way, and by what amount. In the simplest case, the same parameter is always involved, and it is raised or lowered preferably by the smallest possible steps.

This leads to a large number of possible applications. Quite generally suited for this are programmable systems, in which an analytical unit 40 analyzes a sensor signal and possibly other signals. The sensor unit 10 must be freely programmable as regards one or more parameters $c_i$. An example of such systems is the sensing of magnetic field signals, for example to detect and regulate the angular position of the crankshaft, the camshaft, or the anti-blocking system of a motor vehicle.

Although the present invention has been discussed in the context of a sensor element that provides a voltage signal whose magnitude is indicative of the sensed physical measurement, one of ordinary skill will recognize that the present invention is of course not so limited. For example, the present invention is also applicable as a sensor that provides current signals, and/or frequency signals.

Although the present invention has been shown and described with respect to several preferred embodiments thereof, various changes, omissions and additions to the form and detail thereof, may be made therein, without departing from the spirit and scope of the invention.

What is claimed is:

1. A sensor system with variable sensor-signal processing, comprising:
    a integrated circuit sensor unit that includes
        (i) a sensor element that provides a sensed signal in response to a measurement variable, and
        (ii) a memory device that stores adjustable coefficient values; and
        (iii) a sensor signal processing unit that processes said sensed signal using said adjustable coefficient values to provide a sensor output signal on a output line indicative of the measurement variable,
    wherein said integrated circuit sensor unit receives updated adjustable coefficient values via said output line and stores said updated adjustable coefficient values in said memory device.

2. The sensor system of claim 1, further comprising an analytical unit that receives said sensor output signal and provides said updated adjustable coefficient values.

3. The sensor system of claim 2, wherein said adjustable coefficient values can be transmitted by the change of an output load ($I_{load}$) on said output line between said sensor signal processing unit and said analytical unit.

4. The sensor system of claim 3 wherein the output load ($I_{load}$) is continuously variable.

5. The sensor system of claim 3, wherein the output load ($I_{load}$) is stepwise variable.

6. A sensor system with variable sensor-signal processing, comprising:
    a integrated circuit sensor unit that receives power via a first line and includes
        (i) a sensor element that provides a sensed signal in response to a measurement variable, and
        (ii) a memory device that stores adjustable coefficient values; and
        (iii) a sensor signal processing unit that processes said sensed signal using said adjustable coefficient values to provide a sensor output signal on a second line indicative of the measurement variable,
    wherein said integrated circuit sensor unit receives updated adjustable coefficient values via said first line and stores said updated adjustable coefficient values in said memory device.

7. The sensor system of claim 6, wherein said updated adjustable coefficient values can be transmitted to said integrated circuit sensor unit by changing a supply voltage ($U_S$) on said first line for said sensor unit.

* * * * *

UNITED STATES PATENT AND TRADEMARK OFFICE
CERTIFICATE OF CORRECTION

PATENT NO. : 7,139,682 B2  
APPLICATION NO. : 09/977484  
DATED : November 21, 2006  
INVENTOR(S) : Ralf Janke Page 1 of 1

It is certified that error appears in the above-identified patent and that said Letters Patent is hereby corrected as shown below:

Column 2  
line 37, delete "Sensors" and insert --Sensor Systems--

Column 2  
line 8, delete "System" and insert --Systems--

Column 7  
line 12, delete "OUt$_{new}$" and insert --Out$_{new}$--

Signed and Sealed this

Tenth Day of July, 2007

JON W. DUDAS  
*Director of the United States Patent and Trademark Office*

UNITED STATES PATENT AND TRADEMARK OFFICE
CERTIFICATE OF CORRECTION

PATENT NO. : 7,139,682 B2
APPLICATION NO. : 09/977484
DATED : November 21, 2006
INVENTOR(S) : Ralf Janke It is certified that error appears in the above-identified patent and that said Letters Patent is hereby corrected as shown below:

Column 1
line 37, delete "Sensors" and insert --Sensor Systems--

Column 2
line 8, delete "System" and insert --Systems--

Column 7
line 3, delete "(5)" and insert --(4)--
line 12, delete "$OUt_{new}$" and insert --$Out_{new}$--
line 13, delete "$OUt_{new}$" and insert --$Out_{new}$--

Signed and Sealed this

Sixteenth Day of October, 2007

JON W. DUDAS
*Director of the United States Patent and Trademark Office*